(12) United States Patent
Takahara et al.

(10) Patent No.: US 9,570,993 B2
(45) Date of Patent: Feb. 14, 2017

(54) DC-DC CONVERTER

(71) Applicants: Takaaki Takahara, Chiyoda-ku (JP);
Satoshi Murakami, Chiyoda-ku (JP);
Ryota Kondo, Chiyoda-ku (JP);
Masaki Yamada, Chiyoda-ku (JP)

(72) Inventors: Takaaki Takahara, Chiyoda-ku (JP);
Satoshi Murakami, Chiyoda-ku (JP);
Ryota Kondo, Chiyoda-ku (JP);
Masaki Yamada, Chiyoda-ku (JP)

(73) Assignee: Mitsubishi Electric Corporation,
Tokyo (JP)

( * ) Notice: Subject to any disclaimer, the term of this patent is extended or adjusted under 35 U.S.C. 154(b) by 0 days.

(21) Appl. No.: 14/769,173

(22) PCT Filed: Mar. 28, 2013

(86) PCT No.: PCT/JP2013/059255
§ 371 (c)(1),
(2) Date: Aug. 20, 2015

(87) PCT Pub. No.: WO2014/155604
PCT Pub. Date: Oct. 2, 2014

(65) Prior Publication Data
US 2015/0381063 A1 Dec. 31, 2015

(51) Int. Cl.
*H02M 3/335* (2006.01)
*H02M 1/00* (2006.01)
(Continued)

(52) U.S. Cl.
CPC ....... *H02M 3/33546* (2013.01); *H02M 3/3376* (2013.01); *H02M 2001/0058* (2013.01); *Y02B 70/1491* (2013.01)

(58) Field of Classification Search
CPC ...................... H02M 3/33515; H02M 3/33523
(Continued)

(56) References Cited

U.S. PATENT DOCUMENTS

2008/0170418 A1* 7/2008 Nishiyama ............ H02M 3/337
363/17
2008/0247194 A1* 10/2008 Ying .................... H02M 3/3376
363/17
(Continued)

FOREIGN PATENT DOCUMENTS

CN 103259443 A 8/2013
DE 10 2004 036160 A1 2/2005
(Continued)

OTHER PUBLICATIONS

International Search Report Issued May 21, 2013 in PCT/JP2013/059255 Filed Mar. 28, 2013.
(Continued)

*Primary Examiner* — Adolf Berhane
*Assistant Examiner* — Gary Nash
(74) *Attorney, Agent, or Firm* — Oblon, McClelland, Maier & Neustadt, L.L.P.

(57) ABSTRACT

A DC-DC converter wherein a series reactor and primary-side terminals of a transformer are connected between output terminals of a full-bridge inverter in which each of an upper arm and a lower arm includes a switching element and a freewheel diode, and a rectifier circuit and a filter circuit are connected to secondary-side terminals of the transformer. The DC-DC converter includes a circulation current generation mode in which a circulation current flowing between the transformer and the switching element is generated in a power non-transmission period, and a circulation current interruption mode in which the circulation current is interrupted.

8 Claims, 6 Drawing Sheets

(51) Int. Cl.
  *H02M 5/42*     (2006.01)
  *H02M 7/68*     (2006.01)
  *H02M 3/24*     (2006.01)
  *H02M 7/44*     (2006.01)
  *H02M 3/337*    (2006.01)

(58) Field of Classification Search
  USPC .................................. 363/17–21.03, 78, 95
  See application file for complete search history.

(56)     References Cited

U.S. PATENT DOCUMENTS

| | | | | |
|---|---|---|---|---|
| 2009/0097280 | A1* | 4/2009 | Wu | H02M 3/33592 363/17 |
| 2010/0220500 | A1* | 9/2010 | Mino | H02M 1/32 363/17 |
| 2011/0188275 | A1* | 8/2011 | Mino | H02M 1/36 363/49 |
| 2011/0242854 | A1* | 10/2011 | Minami | H02M 1/4258 363/17 |
| 2011/0273909 | A1* | 11/2011 | Christopher | H02M 3/3376 363/17 |
| 2012/0014140 | A1* | 1/2012 | Kajouke | B60L 11/1811 363/20 |
| 2012/0039092 | A1* | 2/2012 | Xu | H02M 3/3376 363/17 |

FOREIGN PATENT DOCUMENTS

| | | |
|---|---|---|
| DE | 10 2004 039691 A1 | 3/2005 |
| DE | 10 2010 060957 A1 | 6/2012 |
| JP | H07-007939 A | 1/1995 |
| JP | 2004 74258 | 3/2004 |
| JP | 2004-74258 A | 3/2004 |
| JP | 2010 207014 | 9/2010 |
| JP | 2011 160616 | 8/2011 |
| JP | 2011-160616 A | 8/2011 |
| JP | 2012 120294 | 6/2012 |

OTHER PUBLICATIONS

Office Action issued Jul. 5, 2016 in Japanese Patent Application No. 2015-507802 (with partial English translation).

German Office Action mailed Jul. 11, 2016 in Patent Application No. 10 2013 006 881.8 (with English Machine Translation).

* cited by examiner

DC-DC CONVERTER

TECHNICAL FIELD

The present invention relates to DC-DC converters including a full-bridge inverter that converts a DC voltage into a high-frequency AC voltage and a rectifier circuit that rectifies its output.

BACKGROUND ART

A primary-side phase-shift type DC-DC converter including a full-bridge inverter combined with a rectifier circuit is configured as follows:

That is, the full-bridge inverter comprises a circuit constituted of a reference phase leg and a control phase leg connected in parallel with each other, in which the reference phase leg includes an upper arm including switching element S1, a snubber capacitor C1 connected in parallel to the switching element S1, and a freewheel diode D1 connected in antiparallel to the switching element S1, and a lower arm including a switching element S2, a snubber capacitor C2 connected in parallel to the switching element S2, and a freewheel diode D2 connected in antiparallel to the switching element S2, with the upper arm and the lower arm connected in series with each other; and the control phase leg includes an upper arm including a switching element S3, a snubber capacitor C3 connected in parallel to the switching element S3, and a freewheel diode D3 connected in antiparallel to the switching element S3, and a lower arm including a switching element S4, a snubber capacitor C4 connected in parallel to the switching element S4, and a freewheel diode D4 connected in antiparallel to the switching element S4, with the upper arm and the lower arm connected in series with each other.

The full-bridge inverter converts a DC voltage supplied to its input terminals into a high-frequency AC voltage, and outputs and supplies the AC voltage to the primary side of a transformer connected to the output terminals thereof. To the secondary side of the transformer is connected the rectifier circuit, which rectifies the high-frequency AC voltage output from the transformer. An output smoothing filter removes high-frequency components from the rectifier output, and the resultant DC voltage is supplied to a load.

Power control in the full-bridge inverter configured as described above is performed basically by phase-shift control or PWM control. When the phase-shift control is used, an overlap angle of the control phase with respect to the reference phase is controlled, thereby controlling transmission power. However, a circulation current that circulates between the primary side switching elements and the transformer arises in a power non-transmission period. Although the circulation current produces an effect of making the primary side switching elements perform soft switching operation, the current does not contribute to the power transmission but generates conduction loss in the transformer and the switching elements in the primary side thereof.

On the other hand, when the PWM control is used, it is a control system that turns on the primary-side switching elements only in a power transmission period and does not cause any circulation current. However, the primary-side semiconductors perform hard switching in the PMW control, which will resultantly increase switching loss.

Under such circumstances, a converter has been disclosed in Patent document 1 as the one that can reduce the switching loss in the primary-side phase-shift type DC-DC converter. In the converter shown in this Patent document 1, instead of a smoothing reactor, a fly-wheel diode and a tap-fitted inductor are added to the output stage of the rectifier circuit, a capacitor voltage-dividing circuit is connected between the input terminals of the inverter, and also a resonance reactor is connected between the voltage-dividing point of the capacitor voltage-dividing circuit and an output terminal of the control-phase side of the inverter. Furthermore, snubber capacitors of the control phase leg are discharged or charged through the resonance reactor, whereby the circulation current flowing through the transformer is decreased and switching loss in the switching elements of the control phase can be reduced.

PRIOR ART DOCUMENT

Patent document

Patent document 1: Japanese Laid-open Patent Publication No. 2012-120294

DISCLOSURE OF THE INVENTION

Problem to be Solved by the Invention

However, a power converter (DC-DC converter) as shown in Patent document 1 needs additional parts such as a capacitor voltage-dividing circuit and a resonance reactor, thereby causing a problem in that the cost will increase.

Furthermore, those additional parts also generate loss, thereby causing another problem in that effects of reducing loss will be lost or diminished.

The present invention has been made to resolve the foregoing problem, and aims at providing a small-sized highly-efficient DC-DC converter at low cost that can, without adding any extra parts, decrease the current circulating in the transformer, the switching elements and the series reactor and reduce the switching loss.

Means for Solving the Problem

A DC-DC converter according to the present invention comprises a full-bridge inverter constituted of a reference phase leg and a control phase leg that are connected in parallel with each other and each include an upper arm and a lower arm connected in series with each other and each including at least a switching element and a freewheel diode connected in antiparallel to this switching element; a series reactor that is connected to at least one of the output terminals of each leg and also connected to a primary-side terminal of a transformer; and a rectifier circuit that rectifies an induced voltage by the transformer and a filter circuit that smoothes a DC voltage output from the rectifier circuit, which are connected to secondary-side terminals of the transformer; the DC-DC converter further comprises a circulation current generation mode in which a circulation current that flows between the transformer and the switching elements is generated in a power non-transmission period, and a circulation current interruption mode in which the circulation current is interrupted.

Advantage of the Invention

In a DC-DC converter according to the present invention, the current circulating in the transformer, the switching elements and the series reactor can be decreased without adding any extra parts, and soft switching operation of the primary-side switching elements can be performed, so that power conversion efficiency can be enhanced, and the converter can be reduced in size, weight and cost.

The foregoing and other objects, features, aspects, and advantages of the present invention will become more apparent from the following detailed description of the present invention when taken in conjunction with the accompanying drawings.

BEST MODE FOR CARRYING OUT THE INVENTION

Embodiment 1

Hereinafter, a DC-DC converter according to Embodiment 1 of the present invention will be explained based on the drawings.

To begin with, a primary-side phase-shift type DC-DC converter, underlying the present invention, with a full-bridge inverter and a rectifier circuit combined together will be explained referring to FIG. 1 and FIG. 2.

Figure 1:
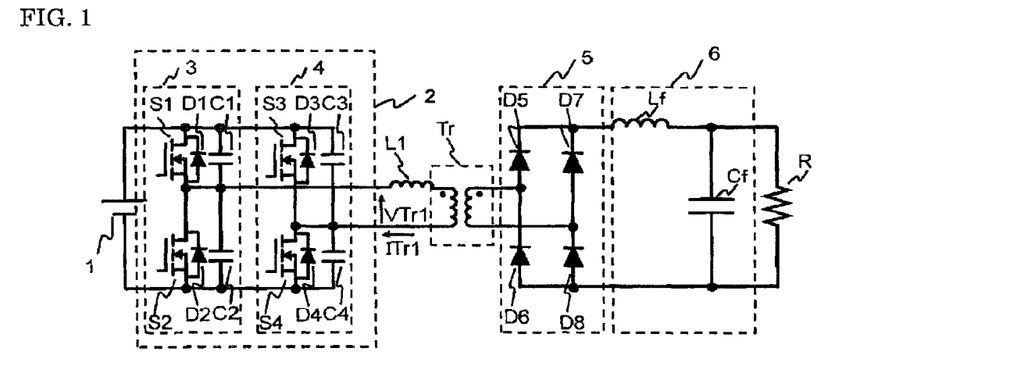
FIG. 1 is a circuit diagram of a basic DC-DC converter underlying the present invention.

In FIG. 1, the full-bridge inverter 2 (hereinafter simply referred to as an inverter) converts a DC voltage from a DC power supply 1 into a high-frequency AC voltage and inputs the voltage to a transformer Tr. A rectifier circuit 5 rectifies the high-frequency AC voltage output from the transformer Tr. An output smoothing filter 6 constituted of a smoothing reactor (choke coil) Lf and a smoothing capacitor Cf removes high-frequency components from the voltage output from the rectifier circuit 5, and the resultant DC voltage is supplied to a load R.

The full-bridge inverter 2 comprises a circuit constituted of a reference phase leg 3 and a control phase leg 4 connected in parallel with each other, in which the reference phase leg includes an upper arm including a switching element S1, a snubber capacitor C1 connected in parallel to the switching element S1, and a freewheel diode D1 connected in antiparallel to the switching element S1, a lower arm including a switching element S2, a snubber capacitor C2 connected in parallel to the switching element S2, and a freewheel diode D2 connected in antiparallel to the element S2, and the upper arm and the lower arm are connected in series with each other; and the control phase leg 4 includes an upper arm including a switching element S3, a snubber capacitor C3 connected in parallel to the switching element S3, and a freewheel diode D3 connected in antiparallel to the switching element S3, a lower arm includes a switching element S4, a snubber capacitor C4 connected in parallel to a switching element S4, and a freewheel diode D4 connected in antiparallel to the switching element S4, and the upper arm and the lower arm are connected in series with each other. Ends of the upper arms of the reference phase leg 3 and the control phase leg 4 that are connected in parallel with each other and ends of the lower arms of the reference phase leg 3 and the control phase leg 4 serve as a positive-side input terminal and a negative-side input terminal, respectively, and the output voltage from the DC power supply 1 is applied between these terminals.

Moreover, the connection point between the upper arm and the lower arm of the reference phase leg 3 and that between the upper arm and the lower arm of the control phase leg 4 serve as their respective output terminals of the full-bridge inverter 2, and the voltage taken out from these inverter output terminals is applied via a series reactor L1 to the primary coil of the transformer Tr.

The rectifier circuit 5 constituted of diodes D5 to D8 is connected to the secondary coil of the transformer Tr, and the output smoothing filter 6 and the load R are connected between output terminals of the rectifier circuit.

Additionally, it is preferable to use for the switching elements S1 to S4 each an IGBT (insulated gate bipolar transistor) to which a diode is connected in antiparallel or a MOSFET (metal oxide semiconductor field effect transistor) between the source and the drain of which a diode is connected. Moreover, the internal diode of the IGBT or the MOSFET may be utilized in place of the freewheel diodes D1 to D4, or a separate diode may be connected externally. The snubber capacitors C1 to C4 each may be an externally-connected capacitor or the output capacitance of the IGBT or the MOSFET may be utilized in place of the capacitors.

Furthermore, the series reactor L1 may be the leakage inductance inherent to the transformer Tr or a separately-connected reactor.

The rectifier circuit 5 includes the rectifier diode D5 whose anode is connected to one end of the secondary coil of the transformer Tr, the rectifier diode D6 whose cathode is connected to the same end, the rectifier diode D7 whose anode is connected to the other end of the secondary coil of the transformer Tr, and the rectifier diode D8 whose cathode is connected to the other end; a full-wave rectifier circuit is configured with the cathodes of the rectifier diode D5 and the rectifier diode D7 connected together and the anodes of the rectifier diode D6 and the rectifier diode D8 connected together.

Additionally, the rectifier circuit 5 may be a push-pull type rectifier circuit that includes rectifier diodes connected in such a way that the anode of a diode is connected to one end of the secondary coil of the transformer Tr, the cathode of another diode is connected to the cathode of the diode, and the anode of the other diode is connected to the other end of the secondary coil of the transformer Tr, or in order to reduce conduction loss in the rectifier diodes, the rectifier circuit may employ a synchronous rectification system using active elements.

Next, the operation of the DC-DC converter when it is driven under the phase-shift control, which is a basic control system for the full-bridge inverter, will be explained using FIG. 2. Additionally, it is assumed that the circuit configuration is the same as that in FIG. 1 and MOSFETs are used for the switching elements constituting the full-bridge inverter 2. In FIG. 2, (a) and (b) show a driving signal supplied to the gates of the switching elements S1 and S2 of the reference phase leg 3 and a driving signal supplied to the gates of the switching elements S3 and S4 of the control phase leg 4, respectively. Moreover, FIG. 2 (c) shows a voltage VTr1 (inverter output voltage) that is input to the transformer; (d) of the same figure shows a current ITr1 that flows through the primary coil of the transformer, Furthermore, (e) to (h) of the same figure show voltages across the switching elements S1 to S4: Vds-S1 to Vds-S4 by solid lines, and Id-S1 to Id-S4 that flow through S1 to S4, respectively, by broken lines.

Additionally, time t0 to t8 represents switching times of the switching elements S1 to S4. Moreover, Vds gives a drain voltage of each switching element with respect to a source voltage thereof; Id gives a current flowing through each switching element with the direction of flowing therein from the drain positive.

Hereinafter, operating states of the DC-DC converter in accordance with switching patterns will be explained using FIG. 2.

At t0, the switching element S1 of the upper arm of the reference phase leg 3 is in the ON state, and the switching element S4 of the lower arm of the control phase leg 4 is turned on. The output voltage VTr1 from the full-bridge inverter 2 is output in the direction indicated by an arrow VTr1 in FIG. 1, so that power is supplied to the load R.

At t1, while the ON state of the switching element S4 of the lower arm of the control phase leg 4 is maintained, the switching element S1 of the upper arm of the reference phase leg 3 is turned off, so as to interrupt the output voltage from the full-bridge inverter 2. At this moment, with the energy stored in the series reactor L1 serving as a power source, a current circulates in the path from the series reactor L1, via the switching element S4 of the lower arm of the control phase leg 4 and the diode D2 of the lower arm of the reference phase leg 3, back to the series reactor L1. The snubber capacitor C2 of the lower arm of the reference phase leg 3 is discharged; the snubber capacitor C1 of the upper arm of the reference phase leg 3 is charged. By this charging operation, rising up of the voltage across the switching element S1 of the upper arm of the reference phase leg 3 becomes gentle, thereby making turn-off operation of the switching element S1 of the upper arm of the reference phase leg 3 soft switching.

At t2, the ON state of the switching element S4 of the lower arm of the control phase leg 4 is maintained, and the switching element S2 of the lower arm of the reference phase leg 3 is turned on. The current path remains intact, and with the energy stored in the series reactor L1 serving as a power source, the current circulates in the path from the series reactor L1, via the switching element S4 of the lower arm of the control phase leg 4 and the switching element S2 of the lower arm of the reference phase leg 3, back to the series reactor L1. The snubber capacitor C2 of the lower arm of the reference phase leg 3 has been discharged at t1, thereby making the turn-on operation of the switching element S2 of the lower arm of the reference phase leg 3 soft switching.

At t3, while the ON state of the switching element S2 of the lower arm of the reference phase leg 3 is maintained, the switching element S4 of the lower arm of the control phase leg 4 is turned off. The voltage across the switching element S4 of the lower arm of the control phase leg 4 rises up due to resonance operation of the snubber capacitor C4 of the lower arm of the control phase leg 4 and the series reactor L1, and the voltage across the switching element S3 of the upper arm of the control phase leg 4 falls accordingly.

At t4, while the ON state of the switching element S2 of the lower arm of the reference phase leg 3 is maintained, the switching element S3 of the upper arm of the control phase leg 4 is turned on. The voltage across the switching element S3 of the upper arm of the control phase leg 4 falls to zero due to the resonance operation described above, whereby the turning on of the switching element S3 of the upper arm of the control phase leg 4 becomes soft switching The operating state between t4 and t8 is symmetrical to that between t0 and t4, so its explanation will be omitted.

The phase-shift control is a control system in which ON-duty D of the switching elements S1 to S4, in order to control power supplied to the load, is fixed at 0.5, and overlap intervals between t0 and t1 and between t4 and t5 are controlled. Additionally, the ON-duty D is given by the following equation (1), where T is a switching period and Ton, ON duration of the switching elements.

Equation 1

$$D = \frac{T_{on}}{T} \quad (1)$$

In the foregoing operating state, in the circulation states from t1 to t3 and from t5 to t7, the current circulates in the switching elements S1 to S4, the transformer Tr, and the series reactor L1, thereby causing conduction loss in each part. The present invention aims at decreasing this circulation current.

Figure 3:
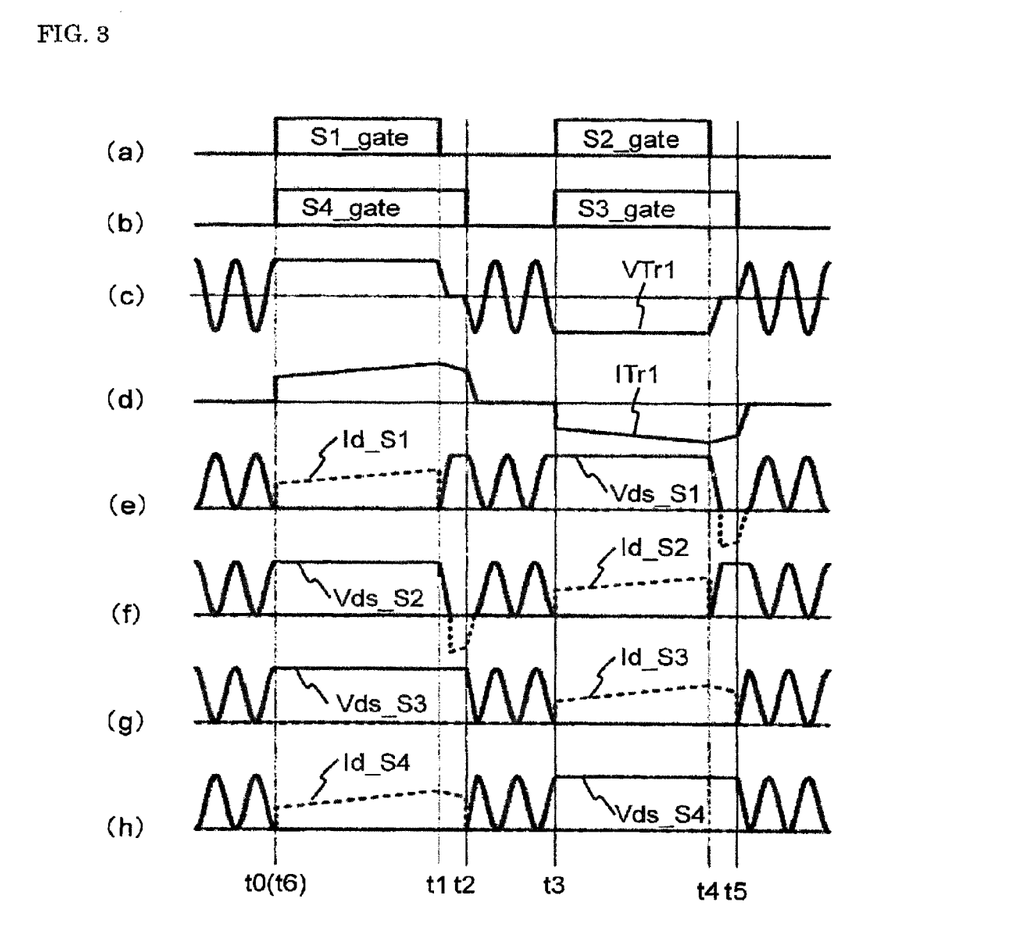
FIG. 3 is an operating waveform diagram at various parts of the DC-DC converter under control of Embodiment 1 of the present invention.

FIG. 3 shows operating waveforms at various parts of the DC-DC converter according to Embodiment 1 of the present invention. Additionally, it is assumed that the circuit configuration thereof is the same as that in FIG. 1 and MOSFETs are used for the switching elements constituting the full-bridge inverter 2.

Figure 2:
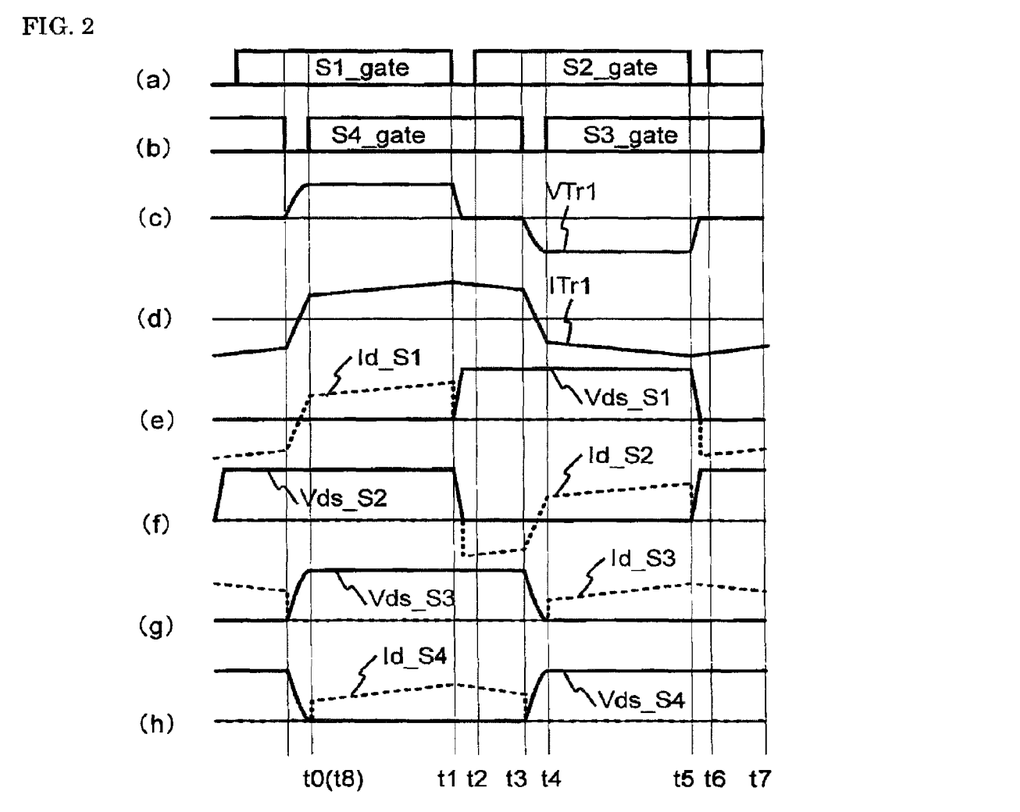
FIG. 2 is an operating waveform diagram at various parts of the DC-DC converter under phase-shift control.

Moreover, (a) to (h) in FIG. 3, the same as FIG. 2, show driving signals supplied to the gates of the switching elements S1 to S4, the voltage VTr1 input to the transformer Tr, the current ITr1 flowing through the primary coil of the transformer, the voltages across the switching elements S1 to S4: Vds-S1 to Vds-S4 (solid lines), and Id-S1 to Id-S4 flowing through S1 to S4 (broken lines), respectively.

Furthermore, time t0 to t6 represents switching times of the switching elements S1 to S4; Vds, a drain voltage of each switching element with respect to a source voltage thereof; and Id, a current through each switching element, with the direction flowing therein from the drain positive.

Hereinafter, operating states of the DC-DC converter of Embodiment 1 in accordance with switching patterns will be explained using FIG. 3. Additionally, in FIG. 3, the period from t0 to t1 described later is referred to as a first ON period; that from t1 to t2, a first circulation period; that from t2 to t3, a first OFF period; that from t3 to t4, a second ON period; that from t4 to t5, a second circulation period; and that from t5 to t6 (t0), a second OFF period.

The switching element S1 of the upper arm of the reference phase leg 3 and the switching element S4 of the lower arm of the control phase leg 4 are turned on at the same time at t0 in FIG. 3. The output voltage VTr1 from the full-bridge inverter 2 is output in the direction indicated by the arrow VTr1 in FIG. 1, so that power is supplied to the load R.

At t1, the ON state of the switching element S4 of the lower arm of the control phase leg 4 is maintained, and the switching element S1 of the upper arm of the reference phase leg 3 is turned off, so as to interrupt the output voltage from the full-bridge inverter 2. With the energy stored in the series reactor L1 serving as a power source, a current circulates in the path from the series reactor L1, via the switching element S4 of the lower arm of the control phase leg 4 and the freewheel diode D2 of the lower arm of the reference phase leg 3, back to the series reactor L1. The snubber capacitor C2 of the lower arm of the reference phase leg 3 is discharged; the snubber capacitor C1 of the upper arm of the reference phase leg 3 is charged. By this charging operation, rising up of the voltage across the switching element S1 of the upper arm of the reference phase leg 3 becomes gentle, thereby making the turn-off operation of the switching element S1 of the upper arm of the reference phase leg 3 soft switching.

The switching element S4 of the lower arm of the control phase leg 4 is turned off at t2, thereby blocking off the circulation path through the series reactor L1. The snubber capacitor C4 of the lower arm of the control phase leg 4 is charged; the snubber capacitor C3 of the upper arm of the control phase leg 4 is discharged. By this charging operation, rising up of the voltage across the switching element S4 of the lower arm of the control phase leg 4 becomes gentle, thereby making turn-off operation of the switching element S4 of the lower arm of the control phase leg 4 soft switching. Following that, the series reactor L1 and the snubber capacitors C1 to C4 are brought into a resonance state. The peak value V of the resonance voltage is given by the following equation (2), where the current value through the switching element S4 at t2 is I, the inductance of the series reactor L1, L, and the capacitance of the snubber capacitors C1 to C4, C.

Equation 2

$$V = \sqrt{\frac{L}{C}} I \quad (2)$$

The switching element S2 of the lower arm of the reference phase leg 3 and the switching element S3 of the upper arm of the control phase leg 4 are turned on at the same time at t3. The output voltage VTr1 from the full-bridge inverter 2 is output in the opposite direction of that indicated by the arrow VTr1 in FIG. 1, so that power is supplied to the load R. The voltage between the drain and the source of each switching element is oscillating by the resonance operation described above. By making the oscillating voltage take a minimum value at t3 (coincide), the turn-on operation of the switching element S2 of the lower arm of the reference phase leg 3 and the switching element S3 of the upper arm of the control phase leg 4 becomes soft switching.

Additionally, the operating state between t3 and t6 is symmetrical to that between t0 and t3, so its explanation will be omitted.

In order to control power supplied to the load, the period between t0 and t1 (first ON period) and that between t3 and t4 (second ON period) are controlled in this control system according to Embodiment 1. The period between t1 and t2 (first circulation period) and that between t4 and t5 (second circulation period) that do not contribute to power transmission can be determined at any length. For example, the duration from t2 to t3 (first OFF period) and that from t5 to t6 (second OFF period) is fixed at integer multiple of the resonance frequency, and the duration from t1 to t2 and that from t4 to t5 is adjusted, whereby soft switching operation can be achieved over a wide operation range, while decreasing the circulation current.

If the phase-shift control described above, which is a basic control system, is compared with the control according to Embodiment 1 of the present invention, the circulation current is interrupted within the ranges from t2 to t3 (first OFF period) and from t5 to t6 (second OFF period) in Embodiment 1, whereby the current circulating in the switching elements S1 to S4, the transformer Tr, and the series reactor L1 can be decreased. In addition, the soft switching operation that has been established in the phase-shift control can also be achieved in the control system according to Embodiment 1 of the present invention.

Next, a variation of Embodiment 1 will be explained using FIG. 4. This variation shows such cases as no snubber capacitors C1 to C4 are provided and the impedance $\omega L$ of the series reactor L1 is small enough compared to the impedance $1/(\omega C)$ of the snubber capacitors in the foregoing equation (2). Additionally, it is assumed that the circuit configuration is the same as that in FIG. 1 and MOSFETs are used for the switching elements constituting the full-bridge inverter 2.

Time t0 to t6 represents switching times of the switching elements S1 to S4. Moreover, Vds gives a drain voltage of each switching element with respect to a source voltage thereof; Id gives a current flowing through each switching element with the direction flowing therein from the drain positive.

Moreover, the same as FIG. 3, the period from t0 to t1 is referred to as a first ON period; that from t1 to t2, a first circulation period; that from t2 to t3, a first OFF period; that from t3 to t4, a second ON period; that from t4 to t5, a second circulation period; and that from t5 to t6 (t0), a second OFF period.

Figure 4:
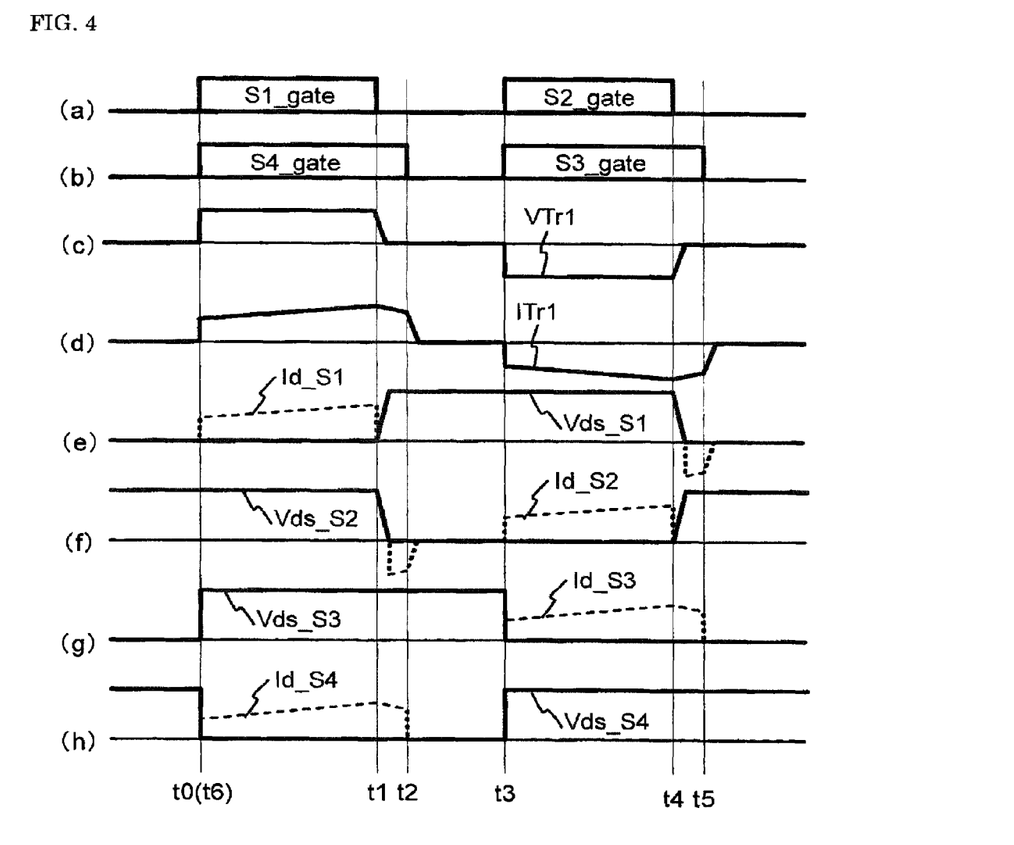
FIG. 4 shows operating waveforms at various parts of the DC-DC converter of a variation of Embodiment 1 of the present invention.

The switching element S1 of the upper arm of the reference phase leg 3 and the switching element S4 of the lower arm of the control phase leg 4 are turned on at the same time at t0 in FIG. 4. The output voltage VTr1 from the full-bridge inverter 2 is output in the direction indicated by the arrow VTr1 in FIG. 1, so that power is supplied to the load R.

At t1, the ON state of the switching element S4 of the lower arm of the control phase leg 4 is maintained, and the switching element S1 of the upper arm of the reference phase leg 3 is turned off, so as to interrupt the output voltage from the full-bridge inverter 2. With the energy stored in the series reactor L1 serving as a power source, a current circulates in the path from the series reactor L1, via the switching element S4 of the lower arm of the control phase leg 4 and the freewheel diode D2 of the lower arm of the reference phase leg 3, back to the series reactor L1. The snubber capacitor C2 of the lower arm of the reference phase leg 3 is discharged; the snubber capacitor C1 of the upper arm of the reference phase leg 3 is charged. By this charging operation, rising up of the voltage across the switching element S1 of the upper arm of the reference phase leg 3 becomes gentle, thereby making the turn-off operation of the switching element S1 of the upper arm of the reference phase leg 3 soft switching.

The switching element S4 of the lower arm of the control phase leg 4 is turned off at t2, so as to block off the circulation current path through the series reactor L1. When the snubber capacitors are not provided or the impedance $\omega L$ of the series reactor L1 is small enough compared to the impedance $1/(\omega C)$ of the snubber capacitors, the snubber capacitor C4 of the lower arm of the control phase leg 4 is not charged, so that the voltage across the switching element S4 of the lower arm of the control phase leg 4 does not rise up. Therefore, the turn-off operation of the switching element S4 of the lower arm of the control phase leg 4 becomes soft switching.

The switching element S2 of the lower arm of the reference phase leg 3 and the switching element S3 of the upper arm of the control phase leg 4 are turned on at the same time at t3. The output voltage VTr1 from the full-bridge inverter 2 is output in the opposite direction of that indicated by the arrow VTr1 in FIG. 1, so that power is supplied to the load R. The turn-on operation of the switching element S2 of the lower arm of the reference phase leg 3 becomes soft switching; turn-on operation of the switching element S3 of the upper arm of the control phase leg 4 becomes hard switching.

The operating state between t3 and t6 is symmetrical to that between t0 and t3, so its explanation will be omitted.

If the foregoing phase-shift control, which is a basic control system, is compared with the control in this variation of Embodiment 1, the circulation current is interrupted within the ranges from t2 to t3 (first OFF period) and from t5 to t6 (second OFF period) in the variation of Embodiment 1, whereby the current circulating in the switching elements S1 to S4, the transformer Tr, and the series reactor L1 can be decreased.

Additionally, the switching patterns of Embodiment 1 described above may be exchanged between the reference phase and the control phase for each switching period. By introducing switching control of exchanging the patterns between the reference phase and the control phase for each switching period, loss generated in each switching element can be made uniform.

As described above, a DC-DC converter according to the present invention comprises a full-bridge inverter constituted of a reference phase leg and a control phase leg that are connected in parallel with each other and each include an upper arm and a lower arm connected in series with each other and each including a switching element and at least a freewheel diode connected in antiparallel to this switching element; a series reactor that is connected to at least one of the output terminals of each leg and also connected to a primary-side terminal of a transformer; and a rectifier circuit that rectifies an induced voltage by the transformer and a filter circuit that smoothes an output DC voltage from the rectifier circuit, which are connected to the secondary-side terminals of the transformer; the DC-DC converter further comprises a circulation current generation mode in which a circulation current that flows between the transformer and the switching elements is generated in a power non-transmission period; and a circulation current interruption mode in which the circulation current is interrupted. Therefore, a DC-DC converter can be provided, in which the current circulating in the transformer, the switching elements and the series reactor can be decreased without using any additional parts to its basic configuration, soft switching operation of the switching elements in the primary side can be achieved, power conversion efficiency can be enhanced, and the converter can be reduced in size, weight and cost. At the same time, the soft switching operation enables the snubber capacitors to absorb surge energy in the switching, whereby the gradient of the rising up of the switching voltage can be suppressed, so that low noise operation can be expected.

Moreover, when the snubber capacitors are not provided or the impedance $\omega L$ of the series reactor L1 is small enough compared to the impedance $1/(\omega C)$ of the snubber capacitors, voltage oscillation does not arise in the period of all the gates being off; therefore, the voltage across the switching elements when turning on and off can be fixed at the voltage of the DC power supply 1 or 0 V.

Furthermore, by introducing the switching control of exchanging the patterns between the reference phase and the control phase for each switching period, loss generated in each switching element can be made uniform.

The cooling capacity of a cooling unit is generally designed in accordance with loss in an element that generates the maximum heat; therefore, by making the loss uniform, the cooling capacity of the unit can be decreased, so that reduction in size and cost of the DC-DC converter can be expected.

Embodiment 2

A DC-DC converter according to Embodiment 2 of the present invention will be explained based on FIG. 5.

Additionally, it is assumed that the circuit configuration is the same as that in FIG. 1 and MOSFETs are used for the switching elements constituting the full-bridge inverter 2.

Figure 5:
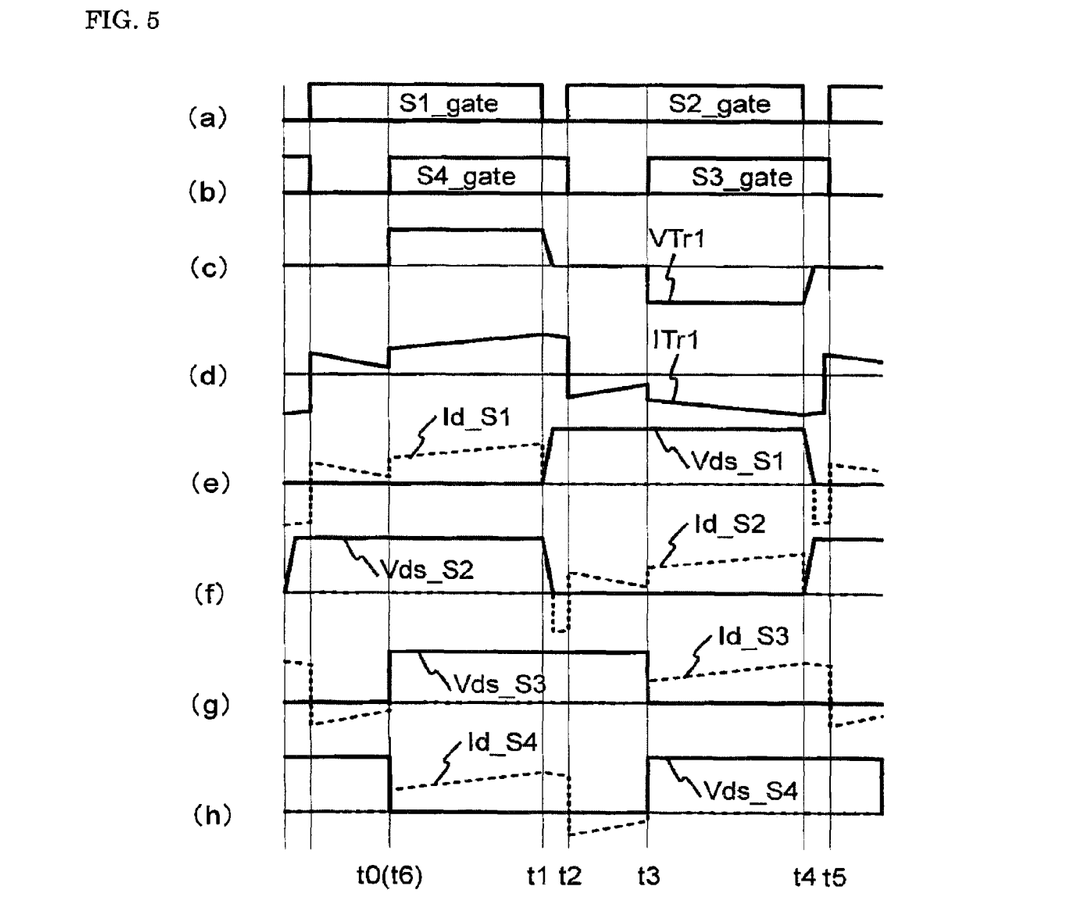
FIG. 5 shows operating waveforms at various parts of the DC-DC converter under control of Embodiment 2 of the present invention.

Moreover, (a) to (h) in FIG. 5 show driving signals supplied to the switching elements S1 to S4, the voltage VTr1 input to the transformer Tr, the current ITr1 flowing through the primary coil of the transformer, voltages across the switching elements S1 to S4: Vds-S1 to Vds-S4 (solid lines), and Id-S1 to Id-S4 flowing through S1 to S4 (broken lines), respectively.

Furthermore, time t0 to time t6 represents switching times of the switching elements S1 to S4; Vds, a drain voltage of each switching element with respect to a source voltage thereof; and Id, a current through each switching element, with the direction flowing therein from the drain positive. Additionally, in FIG. 5, the period from t0 to t1 described later is referred to as a first ON period; that from t1 to t2, a first circulation period; that from t2 to t3, a third circulation period; that from t3 to t4, a second ON period; that from t4 to t5, a second circulation period; and that from t5 to t6 (t0), a fourth circulation period, At t0 in FIG. 5, while the switching element S1 of the upper arm of the reference phase leg 3 is maintained in the ON state, the switching element S4 of the lower arm of the control phase leg 4 is turned on.

The output voltage VTr1 from the full-bridge inverter 2 is output in the direction indicated by the arrow VTr1 in FIG. 1, so that power is supplied to the load R.

At t1, while the switching element S4 of the lower arm of the control phase leg 4 is maintained in the ON state, the switching element S1 of the upper arm of the reference phase leg 3 is turned off, so as to interrupt the output voltage from the full-bridge inverter 2. At this moment, with the energy stored in the series reactor L1 serving as a power source, a current circulates in the path from the series reactor L1, via the switching element S4 of the lower arm of the control phase leg 4 and the freewheel diode D2 of the lower arm of the reference phase leg 3, back to the series reactor L1. The snubber capacitor C2 of the lower arm of the reference phase leg 3 is discharged; the snubber capacitor C1 of the upper arm of the reference phase leg 3 is charged. By this charging operation, rising up of the voltage across the switching element S1 of the upper arm of the reference phase leg 3 becomes gentle, thereby making the turn-off operation of the switching element S1 of the upper arm of the reference phase leg 3 soft switching.

The switching element S4 of the lower arm of the control phase leg 4 is turned off at t2, so as to block off the circulation current path through the series reactor L1. At the same time, the switching element S2 of the lower arm of the reference phase leg 3 is turned on. By turning-off the switching element S4 of the lower arm of the control phase leg 4, the voltage across the snubber capacitor C4 of the lower arm of the control phase leg 4 rises up, so that the series reactor L1 is energized in the opposite direction, thereby reversing the current flowing therethrough.

Since the switching element S2 of the lower arm of the reference phase leg 3 is in the ON state at this moment, there arises a circulation current with the series reactor L1 serving as a power supply. The circulation current flows through the path from the series reactor L1 to the switching element S2 of the lower arm of the reference phase leg 3 and then to the freewheel diode D4 of the lower arm of the control phase leg 4.

The circulation current flows through the freewheel diode D4 connected in antiparallel to the switching element S4 of the lower arm of the control phase leg 4, so no voltage arises between the drain and the source of the switching element; therefore, the turn-off operation of the switching element S4 of the lower arm of the control phase leg 4 becomes soft switching.

At the same time, since the snubber capacitor C2 of the lower arm of the reference phase leg 3 has been discharged at t1 in the switching element S2 of the lower arm of the reference phase leg 3, the turn-on operation of the switching element S2 of the lower arm of the reference phase leg 3 becomes soft switching.

At t3, while the switching element S2 of the lower arm of the reference phase leg 3 is maintained in the ON state, the switching element S3 of the upper arm of the control phase leg 4 is turned on. The output voltage VTr1 from the full-bridge inverter 2 is output in the opposite direction of that indicated by the arrow VTr1 in FIG. 1, so that power is supplied to the load R.

Turn-on operation of the switching element S3 of the upper arm of the control phase leg 4 becomes hard switching.

The operating state between t3 and t6 is symmetrical to that between t0 and t3, so its explanation will be omitted.

In the control system according to this Embodiment 2, the period from t0 to t1 (first ON period) and the period from t3 to t4 (second ON period) are controlled in order to control power supplied to the load; the period from t1 to t2 (first circulation period) and the period from t4 to t5 (second circulation period) are synchronized with a dead time Td of the reference phase leg 3.

If the foregoing phase-shift control, which is a basic control system, is compared with the control by Embodiment 2, the circulation current is interrupted within the ranges from t2 to t3 (first OFF period) and from t5 to t6 (second OFF period) in Embodiment 2, whereby the current circulating in the switching elements S1 to S4, the transformer Tr, and the series reactor L1 can be decreased.

Additionally, switching patterns may be exchanged between the reference phase and the control phase for each switching period in this Embodiment 2 as well. By introducing switching control of exchanging the patterns between the reference phase and the control phase for each switching period, loss generated in each switching element can be made uniform.

Embodiment 3

A DC-DC converter according to Embodiment 3 of the present invention will be explained based on FIG. 6.

Additionally, it is assumed that the circuit configuration is the same as that in FIG. 1 and MOSFETs are used for the switching elements constituting the full-bridge inverter 2.

Figure 6:
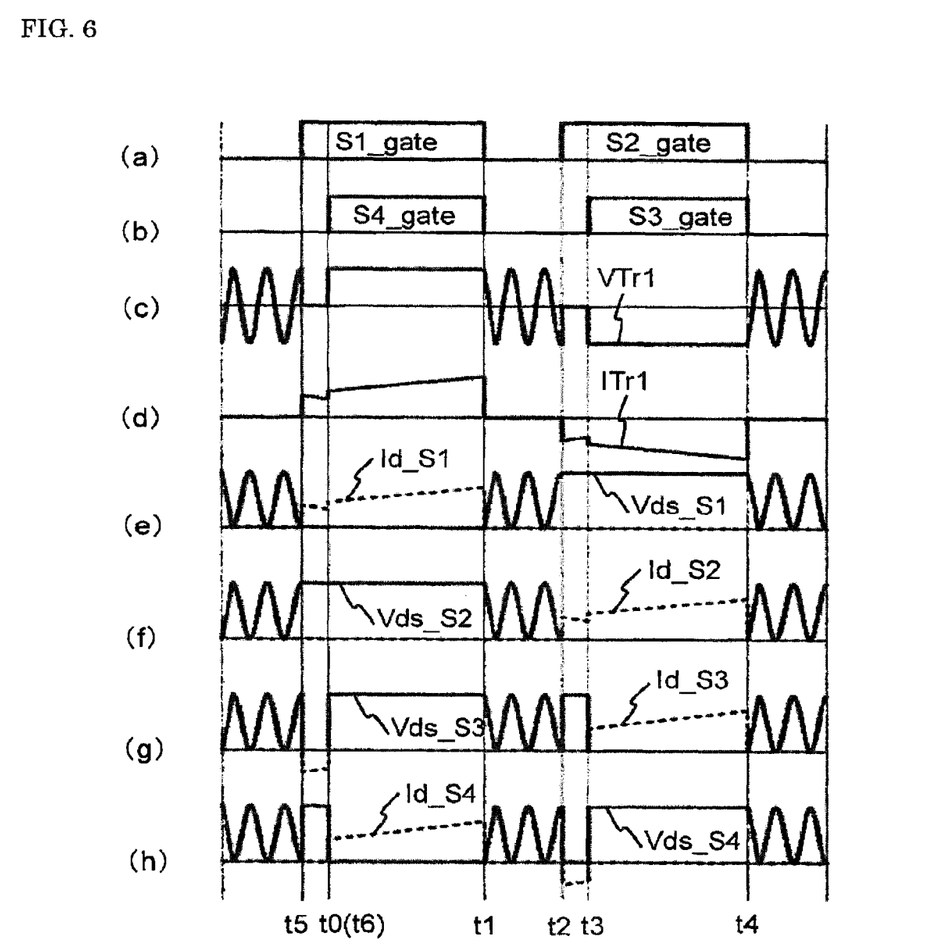
FIG. 6 shows operating waveforms at various parts of the DC-DC converter under control of Embodiment 3 of the present invention.

Moreover, (a) to (h) in FIG. 6 show driving signals supplied to the switching elements S1 to S4, the voltage VTr1 input to the transformer, the current ITr1 flowing through the primary coil of the transformer, voltages across the switching elements S1 to S4: Vds-S1 to Vds-S4 (solid lines), and Id-S1 to Id-S4 flowing through S1 to S4 (broken lines), respectively.

Furthermore, time t0 to t6 represents switching times of the switching elements S1 to S4; Vds, a drain voltage of each switching element with respect to a source voltage thereof; and Id, a current through each switching element, with the direction flowing therein from the drain positive. Additionally, in FIG. 6, the period from t0 to t1 described later is referred to as a first ON period; that from t1 to t2, a first OFF period; that from t2 to t3, a third circulation period; that from t3 to t4, a second ON period; that from t4 to t5, a second OFF period; and that from t5 to t6 (t0), a fourth circulation period.

The switching element S4 of the lower arm of the control phase leg 4 is turned on at t0 in FIG. 6. At this moment, the switching element S1 of the upper arm of the leg for the reference phase is maintained in the ON state.

The output voltage VTr1 from the full-bridge inverter 2 is output in the direction indicated by the arrow VTr1 in FIG. 1, so that power is supplied to the load R.

At t1, the switching element S1 of the upper arm of the reference phase leg 3 and the switching element S4 of the lower arm of the control phase leg 4 are turned off at the same time, and the switching elements S1 to S4 are all brought into the OFF state.

The circulation current is interrupted by turning off all of the switching elements S1 to S4. The snubber capacitor C1 of the upper arm of the reference phase leg 3 and the snubber capacitor C4 of the lower arm of the control phase leg 4 are charged. By this charging operation, rising up of the voltage across the switching element S1 of the upper arm of the reference phase leg 3 and that across the switching element S4 of the lower arm of the control phase leg 4 become gentle, thereby achieving soft switching. Oscillation arises from this time on between the series reactor L1 and the snubber capacitors C1 to C4.

The switching element S2 of the lower arm of the reference phase leg 3 is turned on at t2. The series reactor L1 is energized by the voltage of the snubber capacitor C4 of the lower arm of the control phase leg 4, thereby generating a circulation current. The circulation current flows in the direction from the series reactor L1 to the switching element S2 of the lower arm of the reference phase leg 3 and then to the freewheel diode D4 of the lower arm of the control phase leg 4.

The switching element S2 of the lower arm of the reference phase leg 3 is turned on when the oscillating voltage becomes a minimum value, whereby its soft switching operation is achieved.

At t3, while the switching element S2 of the lower arm of the reference phase leg 3 is maintained in the ON state, the switching element S3 of the upper arm of the control phase leg 4 is turned on. The output voltage VTr1 from the full-bridge inverter 2 is output in the opposite direction of that indicated by the arrow VTr1 in FIG. 1, so that power is supplied to the load R. The turn-on operation of the switching element S3 of the upper arm of the control phase leg 4 becomes hard switching.

Additionally, the operating state between t3 and t6 is symmetrical to that between t0 and t3, so its explanation will be omitted.

In the control system according to this Embodiment 3, the period from t0 to t1 (first ON period) and that from t3 to t4 (second ON period) are controlled in order to control power supplied to the load; the period from t2 to t3 (third circulation period) and the period from t4 to t5 (fourth circulation period) can be set to any length.

If the foregoing phase-shift control, which is a basic control system, is compared with the control by this Embodiment 3, the circulation current is interrupted within the ranges from t1 to t2 (first OFF period) and from t4 to t5 (second OFF period) in Embodiment 3, whereby the current circulating in the switching elements S1 to S4, the transformer Tr, and the series reactor L1 can be decreased.

Additionally, switching patterns may be exchanged between the reference phase and the control phase for each switching period in this Embodiment 3 as well. By introducing switching control of exchanging the patterns between the reference phase and the control phase for each switching period, loss generated in each switching element can be made uniform.

Embodiment 4

A DC-DC converter according to Embodiment 4 of the present invention will be explained based on FIG. 7.

Additionally, it is assumed that the circuit configuration is the same as that in FIG. 1 and MOSFETs are used for the switching elements constituting the full-bridge inverter 2.

Figure 7:
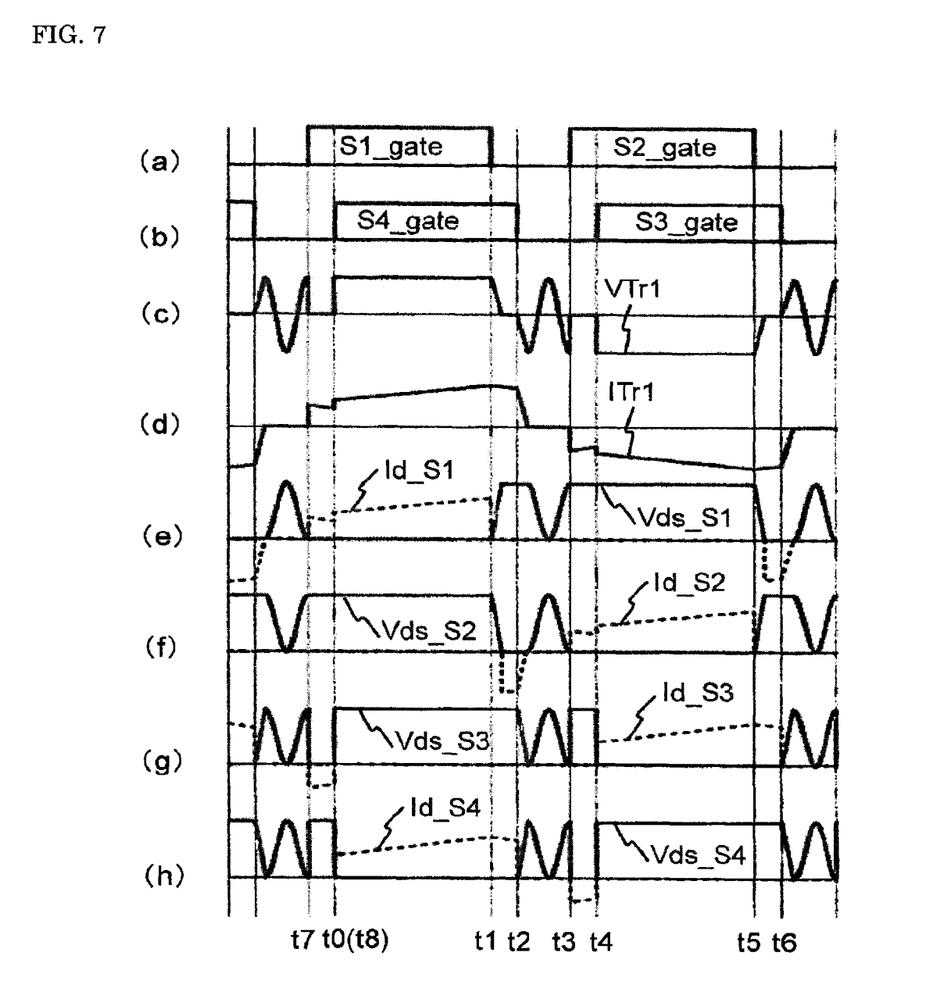
FIG. 7 shows operating waveforms at various parts of the DC-DC converter under control of Embodiment 4 of the present invention.

Moreover, (a) to (h) in FIG. 7 show driving signals supplied to the switching elements S1 to S4, the voltage VTr1 input to the transformer, the current ITr1 flowing through the primary coil of the transformer, voltages across the switching elements S1 to S4: Vds-S1 to Vds-S4 (solid lines), and Id-S1 to Id-S4 flowing through S1 to S4 (broken lines), respectively.

Furthermore, time t0 to t8 represents switching times of the switching elements S1 to S4; Vds, a drain voltage of each switching element with respect to a source voltage thereof; and Id, a current flowing through each switching element, with the direction flowing therein from the drain positive. Additionally in FIG. 7, the period from t0 to t1 described later is referred to as a first ON period; that from t1 to t2, a first circulation period; that from t2 to t3, a first OFF period; that from t3 to t4, a third circulation period; that from t4 to t5, a second ON period; that from t5 to t6, a second circulation period; that from t6 to t7, a second OFF period; and t7 to t8(t0), a fourth circulation period.

The switching element S4 of the lower arm of the control phase leg 4 is turned on at t0 in FIG. 7. At this moment, the switching element S1 of the upper arm of the reference phase leg 3 is maintained in the ON state.

The output voltage VTr1 from the full-bridge inverter 2 is output in the direction indicated by the arrow VTr1 in FIG. 1, so that power is supplied to the load R.

At t1, the switching element S4 of the lower arm of the control phase leg 4 is maintained in the ON state, and the switching element S1 of the upper arm of the reference phase leg 3 is turned off, so as to interrupt the output voltage from the full-bridge inverter 2. At this moment, with the energy stored in the series reactor L1 serving as a power source, a current circulates in the path from the series reactor L1, via the switching element S4 of the lower arm of the control phase leg 4 and the freewheel diode D2 of the lower arm of the reference phase leg 3, back to the series reactor L1. The snubber capacitor C2 of the lower arm of the reference phase leg 3 is discharged; the snubber capacitor C1 of the upper arm of the reference phase leg 3 is charged. By this charging operation, rising up of the voltage across the switching element S1 of the upper arm of the reference phase leg 3 becomes gentle, thereby making the turn-off operation of the switching element S1 of the upper arm of the reference phase leg 3 soft switching.

The switching element S4 of the lower arm of the control phase leg 4 is turned off at t2, and the switching elements S1 to S4 are all brought into the OFF state. The circulation current is interrupted by bringing all of the switching elements S1 to S4 into the OFF state. At this moment, the snubber capacitor C4 of the lower arm of the control phase leg 4 is charged; the snubber capacitor C3 of the upper arm of the control phase leg 4 is discharged. By this charging operation, rising up of the voltage across the switching element S4 of the lower arm of the control phase leg 4 becomes gentle, thereby making the turn-off operation of the switching element S4 of the lower arm of the control phase leg 4 soft switching. Oscillation arises from this time on between the series reactor L1 and the snubber capacitors C1 to C4.

The switching element S2 of the lower arm of the reference phase leg 3 is turned on at t3. The series reactor L1 is energized by the voltage of the snubber capacitor C4 of the lower arm of the control phase leg 4, thereby generating a circulation current. The circulation current flows in the direction from the series reactor L1 to the switching element S2 of the lower arm of the reference phase leg 3 and then to the freewheel diode D4 of the lower arm of the control phase leg 4.

The switching element S2 of the lower arm of the reference phase leg 3 is turned on when the oscillating voltage becomes a minimum value, whereby its soft switching operation is achieved.

At t4, while the switching element S2 of the lower arm of the reference phase leg 4 for the reference phase is maintained in the ON state, the switching element S3 of the upper arm of the control phase leg 4 is turned on. The output voltage VTr1 from the full-bridge inverter 2 is output in the opposite direction of that indicated by the arrow VTr1 in FIG. 1, so that power is supplied to the load R. The turn-on operation of the switching element S3 of the upper arm of the control phase leg 4 becomes hard switching.

Additionally, the operating state between t4 and t8 is symmetrical to that between t0 and t4, so its explanation will be omitted.

In the control system according to this Embodiment 4, the period from t0 to t1 (first ON period) and that from t4 to t5 (second ON period) are controlled in order to control power supplied to the load; the period from t1 to t2 (first circulation period), that from t3 to t4 (third circulation period), that from t5 to t6 (second circulation period), and that from t7 to t8 (fourth circulation period) can be set to any length.

If the foregoing phase-shift control, which is a basic control system, is compared with the control by this Embodiment 4, the circulation current is interrupted within the ranges from t2 to t3 (first OFF period) and from t6 to t7 (second OFF period) in Embodiment 4, whereby the current circulating in the switching elements S1 to S4, the transformer Tr, and the series reactor L1 can be decreased.

Additionally, switching patterns may be exchanged between the reference phase and the control phase for each switching period in this Embodiment 4 as well. By introducing switching control of exchanging the patterns between the reference phase and the control phase for each switching period, loss generated in each switching element can be made uniform.

As described above, in DC-DC converters according to Embodiments 1 to 4 of the present invention, the current circulating in the transformer, the switching elements, and the series reactor can be decreased and operation of the primary-side switching elements can be made soft switching without adding any extra parts, so that power conversion efficiency can be enhanced, and the converters can be reduced in size, weight and cost.

Additionally, various modifications and alterations of this invention will be apparent to those skilled in the art without departing from the scope and spirit of this invention, and it should be understood that this is not limited to the illustrative embodiments set forth herein.

INDUSTRIAL APPLICABILITY

The present invention relates to a DC-DC converter including a full-bridge inverter that converts a DC voltage into a high-frequency AC voltage and a rectifier circuit that rectifies the output, which is beneficial to a DC power supply.

DESCRIPTION OF THE REFERENCE NUMERALS

1: DC power supply
2: full-bridge inverter
3: reference phase leg
4: control phase leg
5: rectifier circuit
6: output smoothing filter
S1: switching element of upper arm of reference phase leg
D1: freewheel diode of upper arm of reference phase leg
C1: snubber capacitor of upper arm of reference phase leg
S2: switching element of lower arm of reference phase leg
D2: freewheel diode of lower arm of reference phase leg
C2: snubber capacitor of lower arm of reference phase leg
S3: switching element of upper arm of control phase leg
D3: freewheel diode of upper arm of control phase leg
C3: snubber capacitor of upper arm of control phase leg
S4: switching element of lower arm of control phase leg
D4: freewheel diode of lower arm of control phase leg
C4: snubber capacitor of lower arm of control phase leg
L1: series reactor
Tr: transformer
D5-D8: rectifier diode
Lf: smoothing reactor
Cf: smoothing capacitor
R: load
VTr1: output voltage from full-bridge inverter 2
ITr1: output current from full-bridge inverter 2

The invention claimed is:

1. A DC-DC converter, comprising:
a full-bridge inverter constituted of a reference phase leg and a control phase leg that are connected in parallel with each other and each include an upper arm and a lower arm connected in series with each other and each including at least a switching element and a freewheel diode connected in antiparallel to the switching element;
a series reactor that is connected to at least one of the output terminals of each leg and also connected to a primary-side terminal of a transformer; and
a rectifier circuit that rectifies an induced voltage by the transformer and a filter circuit that smooths an output DC voltage from the rectifier circuit, which are connected to secondary-side terminals of the transformer;
the DC-DC converter further comprising:
a circulation current generation mode in which a circulation current that flows between the transformer and the switching elements is generated in a power non-transmission period; and
a circulation current interruption mode in which the circulation current is interrupted; wherein
a period in which the reference phase is in the ON state is made different from a period in which the control phase is in the ON state, and
a switching pattern for the control phase leg and another switching pattern for the reference phase leg are exchanged with each other for each switching period.

2. A DC-DC converter according to claim 1, wherein a first circulation period in which the switching element of the upper arm of the reference phase leg is turned off and only the switching element of the lower arm of the control phase leg becomes the ON state, after the first ON period in which the switching element of the upper arm of the reference phase leg and the switching element of the lower arm of the control phase leg are in the ON state, is switched over to a third circulation period in which only the switching element of the lower arm of the reference phase leg is brought into the ON state, until the switching element of the lower arm of the reference phase leg and the switching element of the upper arm of the control phase leg both become the ON state; and
a second circulation period in which the switching element of the lower arm of the reference phase leg is turned off and only the switching element of the upper arm of the reference phase leg becomes the ON state, after a second ON period in which the switching element of the lower arm of the reference phase leg and the switching element of the upper arm of the control phase leg are both in the ON state, is switched over to a fourth circulation period in which only the switching element of the upper arm of the reference phase leg is brought into the ON state, until the switching element of the upper arm of the reference phase leg and the switching element of the lower arm of the control phase leg both become the ON state.

3. A DC-DC converter according to claim 1, wherein
a first OFF period in which all of the switching elements become the OFF state is provided between a first circulation period in which the switching element of the upper arm of the reference phase leg is turned off and only the switching element of the lower arm of the control phase leg is brought into the ON state, after a first ON period in which the switching element of the upper arm of the reference phase leg and the switching element of the lower arm of the control phase leg are in the ON state, and a third circulation period in which only the switching element of the lower arm of the reference phase leg is brought into the ON state, until a second ON period begins in which the switching element of the lower arm of the reference phase leg and the switching element of the upper arm of the control phase leg are both in the ON state; and
a second OFF period in which all of the switching elements become the OFF state is provided between a second circulation period in which the switching element of the lower arm of the reference phase leg is turned off and only the switching element of the upper arm of the control phase leg is brought into the ON state, after the second ON period, and a fourth circulation period in which only the switching element of the upper arm of the reference phase leg is brought into the ON state, until the first ON period begins.

4. A DC-DC converter according to claim 3, wherein duration of the circulation current generation mode is adjusted so that the switching element is turned on when a voltage across the switching element reaches near the minimum value.

5. A DC-DC converter according to claim 1, wherein snubber capacitors are connected in parallel to their respective switching elements of the reference phase leg and the control phase leg, and in the circulation current interruption mode, when an oscillating voltage that is generated by the series reactor and the snubber capacitors and applied to any of the switching elements reaches near a minimum value of the voltage, the switching element is turned on.

6. A DC-DC converter according to claim 1, wherein the leakage inductance of the transformer is utilized in place of the series reactor.

7. A DC-DC converter, comprising:
a full-bridge inverter constituted of a reference phase leg and a control phase leg that are connected in parallel with each other and each include an upper arm and a lower arm connected in series with each other and each including at least a switching element and a freewheel diode connected in antiparallel to the switching element;
a series reactor that is connected to at least one of the output terminals of each leg and also connected to a primary-side terminal of a transformer; and
a rectifier circuit that rectifies an induced voltage by the transformer and a filter circuit that smooths an output DC voltage from the rectifier circuit, which are connected to secondary-side terminals of the transformer;
the DC-DC converter further comprising:
a circulation current generation mode in which a circulation current that flows between the transformer and the switching elements is generated in a power non-transmission period; and
a circulation current interruption mode in which the circulation current is interrupted;
wherein
a period in which the reference phase is in the ON state is made different from a period in which the control phase is in the ON state;
wherein
a first circulation period in which only the switching element of the lower arm of the control phase leg becomes the ON state is provided between a first ON period in which the switching element of the upper arm of the reference phase leg and the switching element of the lower arm of the control phase leg are both maintained in the ON state after turned on at the same time and a first OFF period in which all of the switching elements become the OFF state, until the switching element of the lower arm of the reference phase leg and the switching element of the upper arm of the control phase leg are turned on at the same time; and
a second circulation period in which only the switching element of the upper arm of the control phase leg becomes the ON state is provided between a second ON period in which the switching element of the lower arm of the reference phase leg and the switching element of the upper arm of the control phase leg are both maintained in the ON state after turned on at the same time and a second OFF period in which all of the switching elements become the OFF state, until the switching element of the upper arm of the reference phase leg and the switching element of the lower arm of the control phase leg are turned on at the same time.

8. A DC-DC converter, comprising:
a full-bridge inverter constituted of a reference phase leg and a control phase leg that are connected in parallel with each other and each include an upper arm and a lower arm connected in series with each other and each including at least a switching element and a freewheel diode connected in antiparallel to the switching element;
a series reactor that is connected to at least one of the output terminals of each leg and also connected to a primary-side terminal of a transformer; and
a rectifier circuit that rectifies an induced voltage by the transformer and a filter circuit that smooths an output DC voltage from the rectifier circuit, which are connected to secondary-side terminals of the transformer;
the DC-DC converter further comprising:
a circulation current generation mode in which a circulation current that flows between the transformer and the switching elements is generated in a power non-transmission period; and
a circulation current interruption mode in which the circulation current is interrupted;
wherein
a period in which the reference phase is in the ON state is made different from a period in which the control phase is in the ON state;
wherein after a first ON period in which the switching element of the upper arm of the reference phase leg and the switching element of the lower arm of the control phase leg are in the ON state, a first OFF period in which the switching element of the upper of the reference phase leg and the switching element of the lower arm of the control phase leg are turned off at the same time and all of the switching elements become the OFF state is provided;
a circulation period in which only the switching element of the lower arm of the reference phase leg is in the ON state is provided between the first OFF period and a second ON period in which the switching element of the lower arm of the reference phase leg and the switching element of the upper arm of the control phase leg are both in the ON state;
after the second ON period, a second OFF period in which the switching element of the lower arm of the reference phase leg and the switching element of the upper arm of the control phase leg are turned off at the same time and all of the switching elements become the OFF state is provided; and
another circulation period in which only the switching element of the upper arm of the reference phase leg becomes the ON state is provided between the second OFF period and the first ON period.

* * * * *